(12) United States Patent
Lin et al.

(10) Patent No.: US 6,300,011 B1
(45) Date of Patent: Oct. 9, 2001

(54) ZINC/AIR CELL

(75) Inventors: Lifun Lin, Lincoln; Roger Shepard, Lancaster, both of MA (US)

(73) Assignee: The Gillete Company ( * ) Notice: Subject to any disclaimer, the term of this patent is extended or adjusted under 35 U.S.C. 154(b) by 0 days.

(21) Appl. No.: 09/490,997

(22) Filed: Jan. 25, 2000

(51) Int. Cl.⁷ .............................. H01M 4/24; H01M 4/42
(52) U.S. Cl. ............................................ 429/229; 429/218
(58) Field of Search ................................ 429/229, 218.1, 429/27, 29

(56) References Cited

U.S. PATENT DOCUMENTS

| | | |
|---|---|---|
| 3,897,265 | 7/1975 | Jaggard . |
| 4,500,614 * | 2/1985 | Nagamine et al. ................. 429/206 |
| 5,240,793 | 8/1993 | Glaeser . |
| 5,279,905 | 1/1994 | Mansfield, Jr. et al. . |
| 6,015,636 * | 1/2000 | Goldstein et al. ................... 429/229 |

* cited by examiner

Primary Examiner—Gabrielle Brouillette
Assistant Examiner—M. Wills
(74) Attorney, Agent, or Firm—Barry D. Josephs; Paul I. Douglas; Thomas G. Krivulka

(57) ABSTRACT

An anode composition for zinc/air cells comprises a metal binder added to particulate zinc. The metal binder in contact with the particulate zinc is heated to above its melting point. Upon cooling the metal binder solidifies and adheres to the zinc particle surfaces to form agglomerates wherein individual zinc particles are held bound to each other by the metal binder. Gelling agent and electrolyte can then be added to form an anode mixture. The metal binder has a melting point desirably above about 35° C. and below the melting point of zinc. A preferred metal binder for the particulate zinc is an alloy of indium and bismuth (In/Bi). Other desirable metal binders, for example, can be an alloy of indium, bismuth and tin (In/Bi/Sn) or alloy of indium and tin (In/Sn) as well as indium metal. Use of the metal binder in the anode mixture improves conductivity of the zinc particles and replaces the need to add mercury to the anode composition.

16 Claims, 2 Drawing Sheets

ZINC/AIR CELL

FIELD OF THE INVENTION

The invention relates to a zinc/air cell having an anode comprising zinc and an air cathode. The invention relates to a molten metal binder added to the anode composition to bind zinc particles therein upon cooling.

BACKGROUND

Zinc/air cells are typically in the form of a miniature button cells which have particular utility as batteries for electronic hearing aids including programmable type hearing aids. Such miniature cells typically have a disk-like cylindrical shape of diameter between about 4 and 12 mm and a height between about 2 and 6 mm. Zinc air cells can also be produced in somewhat larger sizes having a cylindrical casing of size comparable to conventional AAAA, AAA, AA, C and D size $Zn/MnO_2$ alkaline cells and even larger sizes.

The miniature zinc/air button cell typically comprises an anode casing (anode cup), and a cathode casing (cathode cup). The anode casing and cathode casing each typically have a cup shaped body with integral closed end and opposing open end. After the necessary materials are inserted into the anode and cathode casings, the open end of the anode casing is typically inserted into the open end of the cathode casing and the cell sealed by crimping. The anode casing can be filled with a mixture comprising particulate zinc. Typically, the zinc mixture contains mercury and a gelling agent and becomes gelled when electrolyte is added to the mixture. The electrolyte is usually an aqueous solution of potassium hydroxide, however, other aqueous alkaline electrolytes can be used. The cathode casing contains an air diffuser (air filter) which lines the inside surface of the cathode casing's closed end. The air diffuser can be selected from a variety of air permeable materials including paper and porous polymeric material. The air diffuser is placed adjacent air holes in the surface of the closed end of the cathode casing. Catalytic material typically comprising a mixture of particulate manganese dioxide, carbon and hydrophobic binder can be inserted into the cathode casing over the air diffuser on the side of the air diffuser not contacting the air holes. An ion permeable separator is typically applied over the catalytic material so that it faces the open end of the cathode casing.

The cathode casing can typically be of nickel plated stainless steel, for example, with the nickel plate forming the cathode casing's outside surface and stainless steel forming the casing's inside surface. The anode casing can also be of nickel plated stainless steel, typically with the nickel plate forming the casing's outside surface. The anode casing can be of a triclad material composed of stainless steel having an outer layer of nickel and an inner layer of copper. In such embodiment the nickel layer typically forms the anode casing's outside surface and the copper layer forms the anode casing's inside surface. The copper inside layer is desirable in that it provides a highly conductive pathway between the zinc particles and the cell's negative terminal at the closed end of the anode casing. An insulator ring of a durable, polymeric material can be inserted over the outside surface of the anode casing. The insulator ring is typically of high density polyethylene, polypropylene or nylon which resists flow (cold flow) when squeezed.

After the anode casing is filled with the zinc mixture and after the air diffuser, catalyst, and ion permeable separator is placed into the cathode casing, the open end of the anode casing can be inserted into the open end of the cathode casing. The peripheral edge of the cathode casing can then be crimped over the peripheral edge of the anode casing to form a tightly sealed cell. The insulator ring around the anode casing prevents electrical contact between the anode and cathode cups. A removable tab is placed over the air holes on the surface of the cathode casing. Before use, the tab is removed to expose the air holes allowing air to ingress and activate the cell. A portion of the closed end of the anode casing can function as the cell's negative terminal and a portion of the closed end of the cathode casing can function as the cell's positive terminal.

Typically, mercury is added in amount of at least one percent by weight, for example, about 3 percent by weight of the zinc in the anode mix. The mercury is added to the anode mix to improve interparticle contact between zinc particles in the anode mixture. This in turn improves electrical conductivity within the anode and thus results in increased cell performance, for example, higher actual specific capacity of the zinc (Amp-hour/g). Also addition of mercury tends to reduce the hydrogen gassing which can occur in the zinc/air cell during discharge and when the cell is placed in storage before or after discharge. The gassing, if excessive, increases the chance of electrolyte leakage, which can damage or destroy the hearing aid or other electronic component being powered. Many regions around the world now greatly restrict the use of mercury in electrochemical cells because of environmental concerns. If other potential gassing inhibitors are added to the anode mix instead of mercury, they either significantly reduce the anode conductivity or have to be added in quantity, thereby significantly reducing the cell's capacity (mAmp-hrs).

U.S. Pat. No. 3,897,265 discloses a representative zinc/air button cell construction with an anode casing inserted into the cathode casing. There is disclosed an insulator between the anode and cathode casings. The anode comprises zinc amalgamated with mercury. The cell includes an assembly comprising an air diffuser, cathode catalyst, and separator at the closed end of the cathode casing facing air holes in the surface of the cathode casing.

U.S. Pat. No. 5,279,905 discloses a miniature zinc/air cell wherein little or no mercury has been added to the anode mix. Instead, the inner layer of the anode casing has been coated with a layer of indium. The disclosed anode casing can be a triclad material composed of stainless steel plated on the outside surface with nickel and on the inside surface with copper. The copper layer is at least 1 microinch ($25.4 \times 10^{-6}$ mm). The reference discloses coating the copper layer on the anode casing's inside surface with a layer of indium. The indium layer is disclosed as being between about 1 microinch and 5 microinches ($25.4 \times 10^{-6}$ mm and $127 \times 10^{-6}$ mm).

It is desired to improve the interparticle conductivity of the zinc in the anode of a zinc/air cell without adding mercury and without significantly increasing gassing.

It is desired to improve the actual specific capacity (m-Amp/g) of the zinc in the anode without adding mercury.

SUMMARY OF THE INVENTION

An aspect of the invention is directed to adding a metal binder to the electrochemically active metal in the anode of a metal/air depolarized cell, particularly the anode of a zinc/air cell. The invention is directed to adding a metal binder to particulate zinc comprising the anode of a zinc/air cell. The metal binder adheres to the surface of the zinc particles and binds the zinc particles. A principal aspect of the invention involves contacting the zinc particles with a metal binder in molten state and cooling the mixture whereupon the metal binder adheres to and binds zinc particles in the mixture.

The metal binder of the invention can be heated to above its melting point and added as a molten liquid to zinc powder. Alternatively, the metal binder can be added to zinc powder and the mixture heated for a period to a temperature above the melting point of the metal binder. In either case the metal binder of the invention is at a temperature above its melting point and thus in a molten state, for a period while in contact with particulate zinc. The mixture comprising particulate zinc and molten (liquified) metal binder is then cooled to about room temperature. As the mixture cools the metal binder solidifies and adheres to individual zinc particles and to at least some other adjacent zinc particles. This causes individual zinc particles to bind in at least pairs forming discrete zinc particle agglomerates. The metal binder physically connects at least some zinc particles to each other and forms electrically conductive pathways therebetween.

The zinc agglomerates can typically contain between about 2 and 500, more typically between about 2 and 100, for example, between about 5 and 100 of individual zinc particles held bound to each other by the solidified metal binder therebetween. Gelling agents and electrolyte solution can then be added to the mixture of zinc agglomerates to form a gelled anode mixture for use in the zinc/air cell. Alternatively, the mixture of zinc agglomerates can be placed in the anode casing and the gelling agent and electrolyte solution added while the mixture is in the casing to form a gelled anode mixture in situ in the anode casing.

The metal binder can be selected from electrically conductive metals or metal alloys which have a melting below the melting point of zinc (below 419° C.) and desirably a melting point above about 35° C. A metal binder (including mixtures of a plurality of metal binders) within such range of melting point can be suitable so long as they can function as an electrically conductive binder or conductive glue which binds and interconnects individual zinc particles. The preferred metal binder desirably has a melting point above about 35° C., preferably a melting point between about 35° C. and 320° C. The metal binder of the invention desirably comprises between about 0.25 and 4, preferably between about 0.5 and 4 percent by weight of the zinc in the anode mixture.

A preferred metal binder for the particulate zinc has been determined to be an alloy of indium and bismuth (In/Bi). Other desirable metal binders have been determined to be an alloy of indium, bismuth and tin (In/Bi/Sn), and an alloy of indium and tin (In/Sn) as well as indium metal (melting point 150° C.). The alloys of indium and bismuth (In/Bi) and indium, bismuth and tin (In/Bi/Sn) and indium and tin (In/Sn) have lower melting point than pure indium and are preferred. The metal binder can comprise mixtures of such suitable individual metals and metal alloys.

The metal binder of the invention connecting the zinc particles in the anode increases the interparticle conductivity and actual specific capacity (Amp-hour/g) of the zinc upon cell discharge. The use of the metal binder to interconnect zinc particles in the anode of a zinc/air cell eliminates the need to add mercury to the cell an thus has particular utility in Zn/Air cells which are essentially mercury free.

Although the metal binder of the invention is principally directed to incorporation within anodes of a zinc/air cells, it can be used as well to bind particulate zinc within the anode of $Zn/MnO_2$ alkaline cells, particularly $Zn/MnO_2$ alkaline cells which are essentially mercury free. The $Zn/MnO_2$ alkaline cell is characterized by an anode comprising zinc, an anode comprising $MnO_2$ and an alkaline electrolyte, typically an aqueous solution of potassium hydroxide.

BRIEF DESCRIPTION OF THE DRAWINGS

The invention will be better understood with reference to the drawings in which.

DETAILED DESCRIPTION

Figure 1:
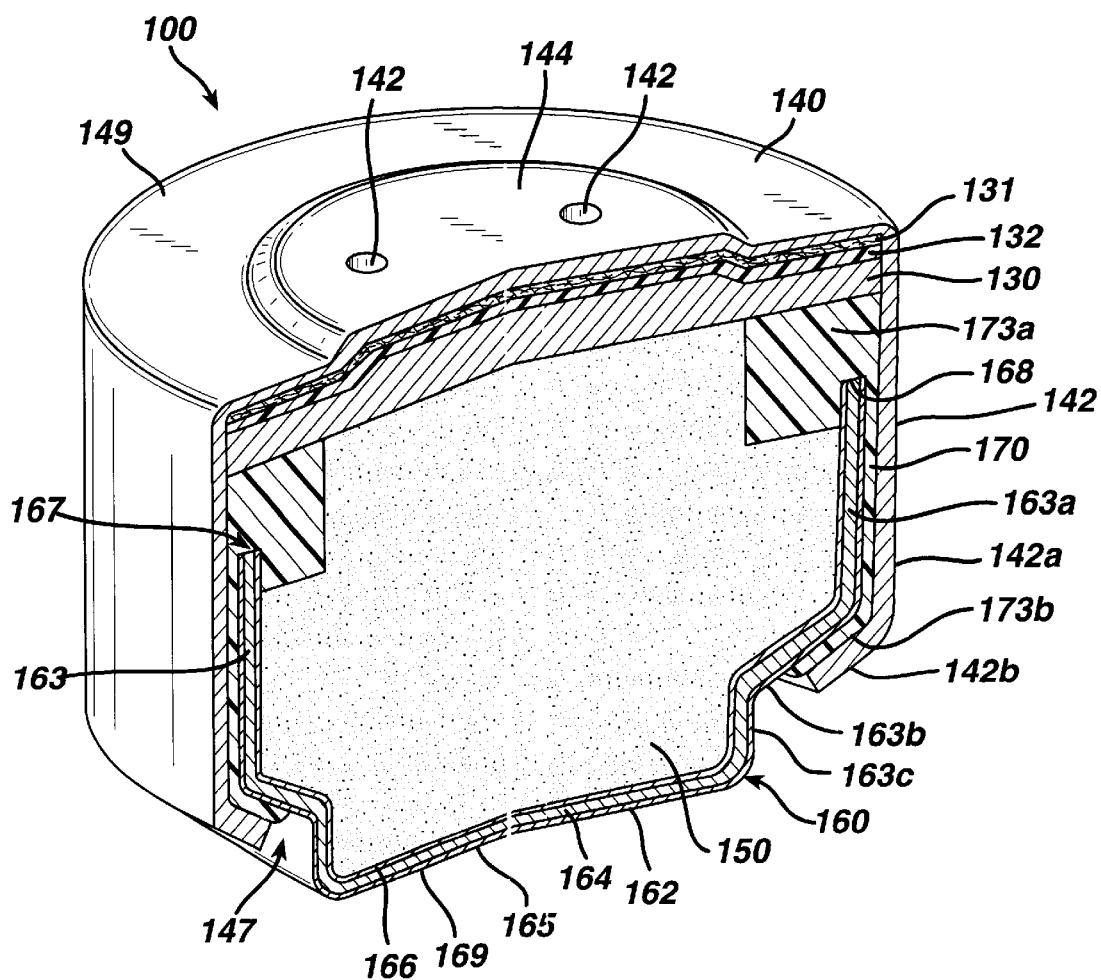
FIG. 1 is an isometric cross sectional view of an embodiment of the zinc/air cell of the invention.

The invention is directed to gas depolarized electrochemical cells. Such cells have a metal anode, typically comprising zinc and an air cathode. The cell is commonly referred to as a metal/air depolarized cell, and more typically a zinc/air cell.

The zinc/air cell of the invention can be essentially mercury free and desirably in the form of a miniature button cell having an anode comprising zinc and an air cathode. The cell has particular application as a power source for electronic hearing aids. The miniature zinc/air cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between about 1.1 volt to 0.2 volt. The cell typically has a substantially flat discharge voltage profile between about 1.1 and about 0.9 volt whereupon the voltage can then fall fairly abruptly to a cut-off of about 0.2 volt. The cell can be discharged at a rate between about 4 and 15 milliAmp, or typically with a resistance load of between about 75 and 275 Ohm. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells, and even larger. The present invention is also intended to be applicable to such larger cell sizes and also to other cell shapes, for example, prismatic or elliptical shapes.

The cell of the invention preferably does not contain any added mercury (zero added mercury cell) and thus is essentially mercury free. In such zero added mercury cells the only mercury present is in trace amounts naturally occurring with the zinc. Accordingly, the zinc/air cell 100 of the invention has a total mercury content less than about 100 parts per million parts by weight of zinc in the anode, preferably less than 50 parts per million parts by weight of zinc in the anode. (The term "essentially mercury free" as used herein shall mean the cell has a mercury content less than about 100 parts per million parts by weight of zinc in the anode.) The cell of the invention can have a very small amount of lead additive in the anode. If lead is added to the anode, the lead content in the cell can typically be between about 100 and 1000 ppm of the zinc in the anode. However, the cell of the invention desirably can also be essentially lead free, that is, the total lead content can be less than 30 ppm, desirably less than 15 ppm of the zinc content of the anode.

The zinc/air cell 100 of the invention has an anode casing 160, a cathode casing 140, and electrical insulator material 170 therebetween. The anode casing 160 has a circumventing body 163, an integral closed end 169, and an opposing open end 167. The cathode casing 140 has a circumventing body 142, an integral closed end 149 and an opposing open end 147. The anode casing 160 contains an anode mixture 150 comprising particulate zinc and alkaline electrolyte. The cathode casing 140 has a plurality of air holes 142 in its surface at the closed end thereof. A catalytic composite material 134 is placed within casing 140 and proximate to the air holes. During cell discharge, the catalytic material 134 facilitates the electrochemical reaction with ambient oxygen as it ingresses through air holes 142 and reacts with electrolyte.

In accordance with the invention a molten metal binder is added in contact with zinc powder during preparation of the anode mixture. The molten metal binder is at temperature above its melting point but below the melting point of the zinc. Upon cooling the metal binder solidifies and adheres to at least a portion of the zinc particles surfaces binding at least a portion of the zinc particles into agglomerates. Each agglomerate contains at least a pair of zinc particles and typically between about 2 and 500, more typically between about 2 and 100, for example, between about 5 and 100 individual zinc particles held bound by the metal binder solidified therebetween. (The metal binder typcially covers at least about 10 percent, more typically at least between about 10 and 50% of a zinc particle which it contacts.) The metal binder is electrically conductive and therefore increases the interparticle conductivity of the zinc particles during cell discharge. This results in an increase in actual specific capacity of the zinc (Amp-hour/g) during cell discharge and eliminates the need to add mercury to the anode mixture.

A preferred embodiment of a zinc/air cell of the invention is shown in FIG. 1. The embodiment shown in FIG. 1 is in the form of a miniature button cell. The cell 100 comprises a cathode casing 140 (cathode cup) an anode casing 160 (anode cup) with an electrical insulator material 170 therebetween. The insulator 170 can desirably be in the form of a ring which can be inserted over the outside surface of the anode casing body 163 as shown in FIG. 1. Insulator ring 170 desirably has an enlarged portion 173a extending beyond peripheral edge 168 of the anode casing (FIG. 1). The insulator 170 with enlarged portion 173a prevents anode active material from contacting the cathode casing 140 after the cell is sealed. Insulator 170 is of a durable electrically insulating material such as high density polyethylene, polypropylene or nylon which resists flow (resists cold flow) when squeezed.

The anode casing 160 and cathode casing 140 are initially separate pieces. The anode casing 160 and cathode casing 140 are separately filled with active materials, whereupon the open end 167 of the anode casing 160 can be inserted into the open end 147 of cathode casing 140. The anode casing 160 is characterized by having a first straight body potion 163a of maximum diameter which extends vertically downwardly (FIG. 1) from peripheral edge 168 to a point which is more than at least 50% of the anode casing 160 height whereupon the casing is slanted inwardly to form slanted midportion 163b. There is a second straight portion 63c extending vertically downwardly from the terminal end of midportion 63b. The second straight portion 163c is of smaller diameter than straight portion 163a. The portion 163c terminates with a 90° bend forming the closed end 169 having a relatively flat negative terminal surface 165. The body 142 of cathode casing 140 has a straight portion 142a of maximum diameter extending vertically downwardly from closed end 149. The body 142 terminates in peripheral edge 142b. The peripheral edge 142b of cathode casing 140 and underlying peripheral edge 173b of insulator ring 170 are initially vertically straight and can be mechanically crimped over the slanted midportion 163b of the anode casing 160. This locks the cathode casing 140 in place over the anode casing 160 and forms a tightly sealed cell.

Anode casing 160 can be separately filled with anode active material by first preparing a mixture of particulate zinc and molten metal binder as above described. Upon cooling of the mixture a powdered gellant material is added. The particle size of the original zinc used to prepare the mixture (i.e., before the metal binder is added) is desirably between about 30 and 350 micron as determined by passing the particles through a sieve. The zinc used to form the mixture with the molten metal binder of the invention (original zinc) can be pure particulate zinc or can also be in the form of particulate zinc alloyed with indium (100 to 1000 ppm). Said zinc can also be in the form a particulate zinc alloyed with indium (100 to 1000 ppm) and bismuth (100 to 1000 ppm). Other alloys of zinc, for example, particulate zinc alloyed with indium (100 to 1000 ppm) and lead (100 to 1000 ppm) can also be used as the starting (original zinc) materials. These particulate zinc alloys are essentially comprised of pure zinc and have the electrochemical capacity essentially of pure zinc. Thus, the term "zinc" shall be understood to include such materials.

The gellant material can be selected from a variety of known gellants which are substantially insoluble in alkaline electrolyte. Such gellants can, for example, be cross linked carboxymethyl cellulose (CMC); starch graft copolymers (e.g. hydrolyzed polyacrylonitrile grafted unto a starch backbone available under the designation Waterlock A221 from Grain Processing Corp.); cross linked polyacrylic acid polymer available under the designation Carbopol C940 (B. F. Goodrich); alkali saponified polyacrylonitrile available as Waterlock A400 Grain Processing Corp).; and sodium salts of polyacrylic acid, e.g., sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 50 can be inserted into the anode casing 60. Alternatively, the dry powder mix of particulate zinc and gellant can be first placed into the anode casing 60 and the electrolyte solution added to form the wet anode mixture 50.

Figure 2:
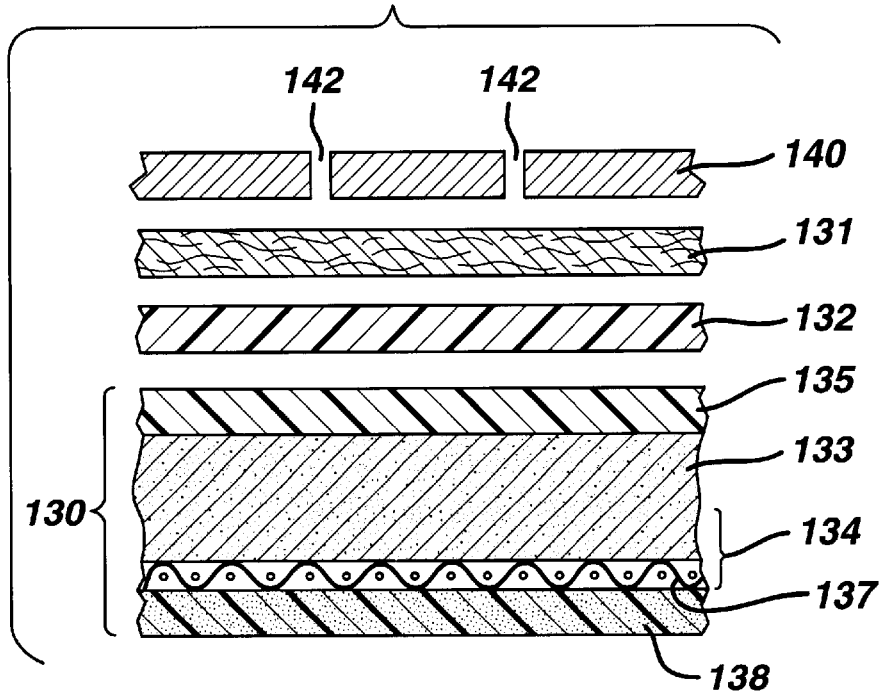
FIG. 2 is an exploded view of the catalytic cathode assembly and air diffuser referenced in FIG. 1.

A catalytic cathode assembly 130 and air diffuser 131 can be inserted into casing 140 as follows: An air diffuser disk 131 (FIGS. 1 and 2), which can be in the form of an air porous filter paper or porous polymeric material can be inserted into the cathode casing 140 so that lies against air holes 142. A separate electrolyte barrier layer 132 (FIGS. 1 and 2), for example, of polytetrafluroethylene (Teflon) can optionally be inserted over the air diffuser 131. The barrier layer 132, if employed, should be hydrophobic and desirably functions to prevent electrolyte from leaking from the cell without significantly retarding the inflow of air into the cell. A catalytic cathode assembly 130 as shown in FIG. 2 can be prepared as a laminate comprising a layer of electrolyte barrier material 135, a layer of cathode catalyst composite 134 under the barrier layer 135 and a layer of ion permeable separator material 138 under the catalyst composite 134, as shown in FIG. 2. Each of these layers can be separately prepared and laminated together by application of heat and pressure to form the catalytic assembly 130. The electrolyte barrier layer 135 can desirably be of polytetrafluroethylene (Teflon). The separator 138 can be selected from conventional ion permeable separator materials including cellophane, polyvinylchloride, acrylonitrile, and microporous polypropylene.

Catalytic cathode composite 134 desirably comprises a hydrophobic catalytic cathode mixture 133 of particulate manganese dioxide, carbon, and hydrophobic binder which is applied by conventional coating methods to a surface of an electrically conductive screen 137, preferably a nickel mesh screen. During application the catalytic mixture 133 is substantially absorbed into the porous mesh of screen 137. The manganese dioxide used in the catalytic mixture 133 can be conventional battery grade manganese dioxide, for example, electrolytic manganese dioxide (EMD). The carbon used in preparation of mixture 133 can be in various forms including graphite, carbon black and acetylene black. A preferred carbon is carbon black because of its high surface area. A suitable hydrophobic binder can be polytetrafluroethylene (Teflon). The catalytic mixture 133 may typically comprise between about 3 and 10 percent by weight $MnO_2$, 10 and 20 percent by weight carbon, and remainder binder. During cell discharge the catalytic mixture 33 acts primarily as a catalyst to facilitate the electrochemical reaction between the incoming air and electrolyte. However additional manganese dioxide can be added to the catalyst and the cell can be converted to an air assisted zinc/air cell. In such cell at least a portion of manganese dioxide becomes discharged, that is, some manganese is reduced during electrochemical discharge along with incoming oxygen.

The individual layers, namely barrier layer 135, catalyst composite 134, and separator 138 can be laminated by application of heat and pressure to form the catalytic assembly 130 shown in FIG. 2. Assembly 130 can be inserted into the cathode casing 140 so that it abuts air diffuser 131 with separator layer 138 facing the open end of casing 140, as shown in FIG. 1. After the air diffuser 131 and catalytic assembly 130 are inserted into casing 140, the open end 167 of the filled anode casing 160 can be inserted into the open end 147 of cathode casing 140. The peripheral edge 142b of the cathode casing can be crimped over the slanted midportion 163b of the anode casing with insulator 170 therebetween, as above described.

Figure 3:
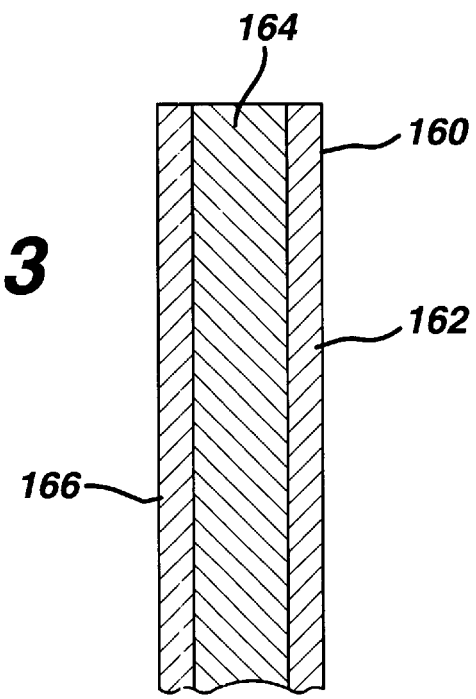
FIG. 3 is a cross sectional view of an embodiment of the anode casing wall.

In the preferred embodiment (FIG. 1) the anode casing 160 has a layer of copper 166 plated or clad on its inside surface so that in the assembled cell the zinc anode mix 150 contacts the copper layer. The copper plate is desired because it provides a highly conductive pathway for electrons passing from the anode 150 to the negative terminal 165 as the zinc is discharged. The anode casing 160 is desirably formed of stainless steel which is plated on the inside surface with a layer of copper. Preferably, anode casing 160 is formed of a triclad material composed of stainless steel 164 which has been clad on its inside surface with a copper layer 166 and on its outside surface with a nickel layer 162 as shown in FIG. 3. Thus, in the assembled cell 100 the copper layer 166 forms the anode casing inside surface in contact with the zinc anode mix 150 and the nickel layer 162 forms the anode casing's outside surface.

The copper layer 166 desirably has a thickness between about 0.0002 inches (0.005 mm) and 0.002 inches (0.05 mm). The stainless steel typically has a thickness between about 0.001 inches (0.0254 mm) and 0.01 inches (0.254 mm) and the nickel layer between about 0.0001 inches (0.00254 mm) and 0.001 inches (0.0254 mm). The total wall thickness of the anode casing 160 composed of the triclad material can be desirably between about 0.001 inches (0.0254 mm) and 0.015 inches (0.38 mm).

The improved zinc/air cell 100 of the invention contains a metal binder which is added to the anode mixture 150 during preparation of the anode. The metal binder additive is solid at room temperature. The metal binder can be first heated to above its melting point in order to liquify the metal. The liquified metal can then be poured into the dry zinc powder followed by mixing before gelling agent and electrolyte is added. Alternatively, the metal binder can be added to the zinc powder forming a physical mixture and the mixture heated to a temperature sufficient to liquify the metal binder. As the mixture comprising metal binder and zinc powder cools, the metal binder soidifies and adheres to a portion of the surface of individual zinc particles binding at least pairs of a portion of the zinc particles to form zinc particle agglomerates. That is, the metal binder upon cooling glues said at least pairs of individual zinc particles together so that they become permanently adhered to each other by the solidified metal binder therbetween. After cooling the mixture of zinc and metal binder, gelling agent and electrolyte is added to form anode mixture 150. The metal binder itself is highly conductive and acts as a conductive binder or conductive glue which physically binds zinc particles together forming the zinc particle agglomerates. Such individual zinc particle agglomerates can typically comprise between about 2 and 500 (or greater) individual zinc particles held bound together by the metal binder. The metal binder increases the interparticle conductivity of individual zinc particles within each of the agglomerates. The overall conductivity of the zinc within the anode mixture is thereby improved. This in turn results in a decrease in the cell's internal resistance and an increase in the actual specific capacity (Amp-hour/g) of the zinc as more of the zinc is utilized during cell discharge.

The metal binder anode additive of the invention desirably comprises between about 0.25 and 4, preferably between about 0.5 and 4 percent by weight of the zinc in the anode mixture, more preferably between about 1 and 4 percent by weight of the zinc. The metal binder has a melting point below the melting point of zinc (419° C.). The metal binder desirably has a melting point beow 300° C., preferably a melting point between about 35° C. and 320° C.

The metal binder can be selected from electrically conductive metals or metal alloys within the above stated range of melting point provided that they function as a conductive binder or conductive glue which adheres to and binds individual zinc particles. The metal binders should also be stable in the electrolyte and desirably evolves little or no hydrogen when in contact with the zinc. A preferred metal binder has been determined to be an alloy of indium and bismuth (In/Bi). Other desirable metal binders can be an alloy of indium, bismuth and tin (In/Bi/Sn) or an alloy of indium and tin (In/Sn). Indium metal (melting point 150° C.) can also be used as the metal binder. The alloys of indium and bismuth (In/Bi); indium, bismuth and tin (In/Bi/Sn); and indium and tin (In/Sn) have lower melting point than pure indium and are preferred. In such preferred embodiments the metal binder is not an alloy of zinc and does not comprise zinc. However, the invention is nevertheless intended to embrace the use of such metal binder which can comprise zinc provided that it has a melting point below the melting point of zinc, preferably within the above stated range in melting point between about 35° C. and 320° C.

The anode mixture 150 containing the metal binder of the invention can be prepared in the following manner for a zinc/air cell 100 having an overall diameter of about 0.608 inches (15.4 mm) and a height (positive to negative terminal) of about 0.314 inches (7.98 mm): A metal binder of indium and bismuth alloy (In/Bi) can be heated in a crucible to a temperature above its melting point in order to liquify the metal binder. A preferred indium/bismuth metal alloy binder has a weight ratio of indium to bismuth of about 66/34 and a melting point of about 72° C. The hot liquified metal can then be added to a dry zinc powder. The zinc powder can be in the form of particulate zinc alloyed with about 100 to 1000 ppm indium and 100 to 1000 ppm indium. A hot mixture of the zinc powder and liquified metal binder is formed. The mixture can then be transferred to a rotating vat (tumbler), for example, to a rotating quartz tube furnace and heating of the mixture continued therein at a temperature between about 100° C. and 200° C. for a period of time while rotating the vat. (The heating temperature between 100° C. and 200° C. is above the melting point of the indium/bismuth metal binder and below the melting point of the particulate zinc.) The heating is carried out preferably in an inert atmosphere of nitrogen or argon to prevent oxidation of the zinc. The mixture is rotated in the vat while heating for a period of about 10 to 30 minutes until a homogenous mixture is obtained. During this period the liquified metal binder coats at least a portion of the individual zinc particles. The mixture is then gradually cooled to ambient temperature, preferably while continuing to rotate the mixture in the vat. As the mixture cools the metal binder solidifies and causes individual zinc particles to bind to each other forming discrete zinc agglomerates. The agglomerates can typically contain between about 2 and 500 (or greater) of individual zinc particles held bound to each by the metal binder solidified and adhered to the individual zinc particles.

A suitable gelling agent can then be added to the mixture of zinc agglomerates. The resulting mixture is then stirred and can be inserted into the anode casing 160. Electrolyte solution, preferably an aqueous solution comprising potassium hydroxide can then be added to the mixture in the anode casing 160 to form a gelled anode mixture 150.

In a specific embodiment the cell 100 can have an overall diameter of about 0.608 inches (15.4 mm) and a height (positive to negative terminal) of about 0.314 inches (7.98 mm). The anode mixture 150 prepared in the manner above described can have the following composition: Zn (78.56 Wt. %); Gelling Agent Waterlock J-550 (0.26 Wt. %); Aqueous KOH electrolyte (19.61 Wt. %); Metal Indium/Bismuth Alloy Binder (1.57 wt. %). The zinc (before addition of the metal binder) can have an average particle size between about 30 and 350 micron as measured by passing the zinc through a sieve. The zinc can be pure or, essentially pure, for example, can be in the form of particulate zinc alloyed with bismuth (100 to 1000 ppm) and indium (100 to 1000 ppm). The aqueous electrolyte can be an aqueous mixture of 35 wt. % KOH and 2 wt. % ZnO. The anode 150 can contain zero added mercury (mercury content was less than 100 ppm of zinc weight). The anode mixture 150 inserted into anode casing 160 can contain about 2.0 g zinc.

The cathode catalyst composite 137 can have the following composition: $MnO_2$ (EMD) 4.6 wt. %, carbon black 15.3 wt %, Teflon binder 18.8 wt. %, and nickel mesh screen, 61.2 wt. %. The total cathode catalyst composite 137 can be 0.140 g.

The benefit of the invention can be demonstrated by the following examples.

EXAMPLE 1

(In/Bi Metal Binder Added to Anode With Zero Added Mercury)

A miniature zinc/air cell was prepared having the components as above described (FIG. 1). The cell had an overall diameter of about 0.608 inches (15.4 mm) and a height (positive to negative terminal) of about 0.314 inches (7.98 mm). The cathode casing 40 was nickel plated steel having a wall thickness of about 0.01 inches (0.25 mm). The cathode catalyst composite 37 had the following composition: $MnO_2$ (EMD) 4.6 wt. %, carbon black 15.3 wt %, Teflon binder 18.8 wt. %, and nickel mesh screen, 61.2 wt. %. The total cathode catalyst composite 137 was 0.140 g.

The anode casing 160 was of triclad material having an outer layer of nickel 162, a midlayer of stainless steel 164, and an inner layer of copper 166. The anode casing wall total thickness was about 0.0119 inches (0.302 mm). The anode 150 contained zero added mercury (mercury content was less than 100 ppm of the zinc). The anode 150 was prepared as above described adding a molten (liquified) metal binder additive to the dry zinc powder during preparation of the anode mix. Specifically 2 wt. % of a indium/bismuth metal alloy based on the total amount of zinc was added to the zinc powder during preparation of the anode 150 mixture. The indium/bismuth metal alloy additive had a weight ratio of indium to bismuth of about 66/34. The anode mixture was prepared by first heating the indium/bismuth alloy to a temperature above its melting point in order to liquify the alloy. The hot liquified indium/bismuth alloy was then added to dry zinc powder. The zinc powder was in the form of particulate zinc alloyed with 500 ppm indium and 500 ppm bismuth. The mixture was then continually heated to a temperature of between about 100° C. and 200° C. for a period of about 10 to 30 minutes by heating the mixture in a rotating vat in an inert atmosphere of argon gas until a homogenous mixture was obtained. The mixture was then left to cool gradually to room temperature (20° C. to 27° C.). As the mixture cooled, the metal binder coated a portion of the zinc particles causing binding of individual zinc particles into agglomerates. The zinc particles within the agglomerates are held bound to each other by the metal binder which had become solidified and adhered to and between surfaces of the zinc particles. Dry gellant powder (Waterlock J-550) was then added to the cooled mixture of zinc agglomerates and the resulting mixture was stirred and inserted into the anode casing 160. An aqueous electrolyte solution (35 wt. % KOH and 2 wt. % ZnO) was then added to the mixture forming a gelled anode mixture 150 within anode casing 160. The gelled anode mixture 150 had the following composition: Zn (78.56 Wt. %); Gelling Agent Waterlock J-550 (0.26 Wt. %); Aqueous KOH electrolyte (19.61 Wt. %); Metal Indium/Bismuth Alloy Binder (1.57 wt. %). The amount of zinc in the anode was 2.0 g. The original zinc (before addition of metal/bismuth alloy binder was in the form of particulate zinc alloyed with indium (100–1000 ppm) and bismuth (100–1000 ppm). The anode 150 contained zero added mercury (mercury content was less than 100 ppm of the zinc.).

Ten cells as above described were prepared and the cells were discharged at a constant load of 220 ohm to a cutoff voltage of 0.9 Volts. The average actual service life of the cells discharged to the cutoff voltage of 0.9 Volts was 267 hours.

EXAMPLE 2
(In/Bi/Sn Metal Binder Added to Anode With Zero Added Mercury)

Identical cells were prepared as in Example 1 with same size cell, and same cathode catalyst, identical components, and same anode casing and cathode casing material. The anode composition and weight was also the same as in Example 1 except that 2 wt. % (based on weight of zinc) of a different metal binder was employed as the metal binder for the particulate zinc. The metal binder employed was an alloy of indium, bismuth and tin (In/Bi/Sn). The metal alloy was composed of 51 wt. % indium, 32.5 wt. % bismuth, and 16.5 wt. % tin. The metal binder was first melted and applied in molten (liquid) form to the zinc dry powder. The hot mixture of zinc and metal binder was then reheated in a rotating vat at a temperature between about 100° C. and 200° C. in an inert argon atmosphere for a period of between about 10 and 30 minutes as above described. The mixture was left to cool to room temperature as above described forming zinc particle agglomerates comprising individual zinc particles held bound together by the solidified metal binder. The gellant material was added to the cooled mixture and the resulting mixture was inserted into an anode casing 160. Electrolyte was added to the mixture while it was in the anode casing. A measured amount of the resulting mixture was inserted into the anode casing and gelling agent. The same particulate zinc, gelling agent and electrolyte and same amount of zinc was employed the above described composition, except that the metal binder was the In/Bi/Sn binder instead of the In/Bi binder. The amount of zinc in the anode was 2.0 g as in Example 1. The original zinc forming the anode, as in Example 1, was in the form of particulate zinc alloyed with indium (100–1000 ppm) and bismuth (100–1000 ppm). The anode 150 contained zero added mercury (mercury content was less than 100 ppm of the zinc).

Ten cells with the In/Bi/Sn metal binder were prepared and the cells were discharged at a constant load of 220 ohm to a cutoff voltage of 0.9 Volts. The average actual service life of the cells to the cutoff voltage of 0.9 Volts was 262 hours.

EXAMPLE 3
(Indium Metal Binder Added to Anode With Zero Added Mercury)

Identical cells were prepared as in Example 1 with same size cell, same cathode catalyst, identical components, same anode casing and cathode casing material. The anode composition and weight was also the same as in Example 1 except that 1 wt. % (based on weight of zinc) of a different metal binder was employed as the metal binder for the particulate zinc. The metal binder employed was indium metal (In). The metal binder was first melted and applied in liquid form to the zinc dry powder. The mixture of zinc and metal binder was then heated in a rotating vat at a temperature between about 100° C. and 200° C. in an inert atmosphere of argon for a period of between about 10 and 30 minutes as above described. The mixture was left to cool to room temperature as above described forming zinc particle agglomerates comprising individual zinc particles held bound together by the solidified metal binder. The gellant material was added to the cooled mixture and the resulting mixture was inserted into an anode casing 160. Electrolyte was added to the mixture while it was in the anode casing. A measured amount of the resulting mixture was inserted into the anode casing and gelling agent. The same particulate zinc, gelling agent and electrolyte and same amount of zinc was employed the above described composition, except that the metal binder was the indium. The amount of zinc in the anode was 2.0 g as in Example 1. The origial zinc as in Example 1 was in the form of particulate zinc alloyed with indium (100–1000 ppm) and bismuth (100–1000 ppm). The anode 50 contained zero added mercury (mercury content was less than 100 ppm of the zinc).

Ten cells with the indium metal binder were prepared and the cells were discharged at a constant load of 220 ohm to a cutoff voltage of 0.9 Volts. The average actual service life of the cells to the cutoff voltage of 0.9 Volts was 258 hours.

EXAMPLE 4
(Comparative)—Mercury Added to Anode/Zero Metal Binder Added to Anode Identical cells were prepared as in Example 1 with same size cell, same cathode catalyst, identical components, same anode casing and cathode casing material. The anode composition and amount of zinc was essentially the same as in Example 1 except that mercury was added in conventional amount of 3 wt. % of the zinc and the metal binder of the invention was not added to the anode mixture. The zinc as in Example 1 was in the form of particulate zinc alloyed with indium (100–1000 ppm) and bismuth (100–1000 ppm). The anode mixture contained the same amount of zinc (2 g) as in Example 1.

The anode composition was Zn (77.82 Wt. %); Gelling Agent Waterlock J-550 (0.26 Wt. %); Aqueous KOH electrolyte (19.59 Wt. %); Mercury (2.33 wt. %). The amount of zinc in the anode was 2.0 g as in Example 1.

Ten cells having an anode with mercury additive and without the metal binder of the invention were prepared and the cells were discharged at a constant load of 220 ohm to a cutoff voltage of 0.9 Volts. The average actual service life of the cells to the cutoff voltage of 0.9 Volts was 243 hours.

EXAMPLE 5
(Comparative)—Zero Mercury Added to Anode/No Metal Binder Added to Anode Identical cells were prepared as in Example 1 with same size cell, same cathode catalyst, identical components, same anode casing and cathode casing material. The anode composition and amount of zinc was essentially the same as in Example 1 except that no mercury was added to the anode mixture and no metal binder of the invention was added to the anode mixture. The origial zinc as in Example 1 was in the form of particulate zinc alloyed with indium (100–1000 ppm) and bismuth (100–1000 ppm). The anode 150 contained zero added mercury (mercury content was less than 100 ppm of the zinc) and zero metal binder. The anode mixture contained the same amount of zinc (2 g) as in Example 1.

The anode composition was Zn (79.80 Wt. %); Gelling Agent Waterlock J-550 (0.26 Wt. %); Aqueous KOH electrolyte (19.94 Wt. %). The amount of zinc in the anode was 2.0 g as in Example 1.

Ten cells were prepared and the cells were discharged at a constant load of 220 ohm to a cutoff voltage of 0.9 Volts. The average actual service life of the cells to the cutoff voltage of 0.9 Volts was 238 hours.

The performance test results of the cells discharged in the above examples are reported in Table 1.

TABLE 1

Zn/AIR BUTTON CELLS DISCHARGED TO 0.9 VOLT
AT CONSTANT LOAD OF 220 OHM

|  | Actual Zn Specific Capacity (Amp-hour/g) | Service Life, Hours |
| --- | --- | --- |
| Example 1 (Anode With Indium/Bismuth Metal Binder And Zero Added Mercury) | 0.67 | 267 |
| Example 2 (Anode With Indium/Bismuth/Sn Metal Binder And Zero Added Mercury) | 0.65 | 262 |
| Example 3 (Anode With Indium Metal Binder And Zero Added Mercury) | 0.64 | 258 |
| Example 4 (Anode with 3 wt. % Added Hg And Without Metal Binder) | 0.61 | 245 |
| Example 5 (Anode with Zero Added Hg And Without Metal Binder) | 0.59 | 238 |

Inspection of Table shows that the actual specific capacity of the zinc in the cell as well as the cell's service life increased when the metal binder of the invention was added to the anode composition compared to cells with zero added mercury and without any added metal binder (Example 5). The greatest improvement is realized with a metal binder of indium and bismuth alloy (In/Bi) added to the anode composition. Also, the actual specific capacity of the zinc in the cell as well as the cell's service life increased over comparative cells that contained 3 wt. % Hg (based on amount of zinc) added to the anode mixture and without any added metal binder (Example 4). Preliminary tests also show less cell gassing during discharge and storage when the metal binder of the invention is added to the anode with zero added mercury compared to the same cell with zero added mercury and without any metal binder.

Although the metal binder of the invention is principally directed to incorporation within anodes of a zinc/air cells, it can be used as well to bind particulate zinc within the anode of $Zn/MnO_2$ alkaline cells. The $Zn/MnO_2$ alkaline cell is characterized by an anode comprising particulate zinc, an anode comprising $MnO_2$ and an alkaline electrolyte, typically an aqueous solution of potassium hydroxide. The anode composition of such $Zn/MnO_2$ alkaline cells are similar to that described herein. Thus, the method of preparation of the anode mixture described herein utilizing the binder of the invention can be applied as well to the preparation of anode mixtures for use in $Zn/MnO_2$ alkaline cell, particularly $Zn/MnO_2$ alkaline cells which are essentially mercury free.

Although the invention has been described with reference to specific embodiments, it should be appreciated that other embodiments are possible without departing from the concept of the invention. Therefore, the invention is not intended to be limited to the specific embodiments but rather its scope is reflected by the claims and equivalents thereof.

What is claimed is:

1. A zinc/air cell having an anode comprising zinc particles, wherein said cell comprises less than 100 parts by weight mercury per million parts by weight zinc, said anode comprising a metal binder adhered to at least a portion of the surface of a said zinc particles and binding at least a portion of individual zinc particles to form agglomerates, wherein said metal binder has a melting point below the melting point of said zinc and said anode is made by the process comprising contacting said zinc particles with said metal binder being in molten state at a temperature above its melting point but below the melting temperature of said zinc to form a mixture thereof and cooling said mixture whereupon said metal binder solidifies and adheres to the surface of at least a portion of said zinc particles binding at least a portion of said zinc particles together to form a plurality of zinc particle agglomerates held bound together by said metal binder therebetween, wherein said metal binder provides an electrically conductive pathway between said bound zinc particles.

2. The zinc/air cell of claim 1 wherein said anode is made by adding gelling agent and alkaline electrolyte to said mixture comprising zinc and metal binder after said step of cooling said mixture.

3. The zinc/air cell of claim 1 wherein said mixture comprising the molten metal binder and said zinc is further subjected to mixing while being maintained at a temperature between 100° C. and 200° C. before cooling said mixture.

4. The zinc/air cell of claim 1 wherein said cooling of said mixture is to a temperature below the melting point of said metal binder whereupon said metal binder binds individual zinc particles and provides an electrical pathway therebetween.

5. The zinc/air cell of claim 1 wherein at least a portion of said agglomerates comprise between 5 and 100 individual zinc particles.

6. The zinc/air cell of claim 1 wherein said zinc particles have an average particle size between about 30 and 350 micron.

7. The zinc/air cell of claim 1 wherein said cooling of the mixture comprising zinc particles and metal binder is to a room temperature between about 20° C. and 27° C.

8. The zinc/air cell of claim 1 wherein the temperature of said molten metal binder is above its melting temperature at a temperature between about 35° C. and 320° C.

9. The zinc/air cell of claim 1 wherein said metal binder comprises an alloy of indium and bismuth.

10. The zinc/air cell of claim 1 wherein said metal binder comprises and alloy of indium, bismuth and tin.

11. The zinc/air cell of claim 1 wherein said metal binder comprises an alloy of indium and tin.

12. The zinc/air cell of claim 1 wherein said metal binder comprises indium.

13. The zinc/air cell of claim 1 wherein said metal binder comprises between about 0.25 and 4 percent by weight of said zinc.

14. The zinc/air cell of claim 1 wherein said anode comprises less than 50 parts by weight mercury per million parts by weight zinc.

15. The zinc/air cell of claim 1 wherein said cell comprises a catalytic cathode and alkaline electrolyte.

16. The zinc/air cell of claim 4 wherein said heating of the mixture of zinc and metal binder is carried out while said mixture is exposed to an inert atmosphere selected from the group consisting of argon and nitrogen gas.

* * * * *